United States Patent
Zhang et al.

(10) Patent No.: US 11,966,847 B2
(45) Date of Patent: Apr. 23, 2024

(54) METHOD FOR CONSTRUCTING EFFICIENT PRODUCT SURFACE DEFECT DETECTION MODEL BASED ON NETWORK COLLABORATIVE PRUNING

(71) Applicant: Donghua University, Shanghai (CN)

(72) Inventors: Jie Zhang, Shanghai (CN); Junliang Wang, Shanghai (CN); Xin Liu, Shanghai (CN); Jinsong Bao, Shanghai (CN)

(73) Assignee: DONGHUA UNIVERSITY, Shanghai (CN)

( * ) Notice: Subject to any disclaimer, the term of this patent is extended or adjusted under 35 U.S.C. 154(b) by 812 days.

(21) Appl. No.: 17/098,468

(22) Filed: Nov. 16, 2020

(65) Prior Publication Data

US 2021/0295165 A1 Sep. 23, 2021

(30) Foreign Application Priority Data

Mar. 18, 2020 (CN) .......................... 202010193038.0

(51) Int. Cl.
| | |
|---|---|
| G06N 20/00 | (2019.01) |
| G06F 17/15 | (2006.01) |
| G06N 3/04 | (2023.01) |
| G06N 3/082 | (2023.01) |
| G06T 7/00 | (2017.01) |

(52) U.S. Cl.
CPC ............. *G06N 3/082* (2013.01); *G06F 17/15* (2013.01); *G06N 3/04* (2013.01); *G06T 7/0004* (2013.01); *G06T 2207/20081* (2013.01); *G06T 2207/20084* (2013.01); *G06T 2207/30108* (2013.01)

(58) Field of Classification Search
CPC .......... G06N 3/082; G06N 3/04; G06N 3/045; G06N 3/084; G06N 3/086; G06N 3/126; G06F 17/15; G06T 7/0004; G06T 2207/20081; G06T 2207/20084; G06T 2207/30108; G06T 2207/30124;
(Continued)

(56) References Cited

U.S. PATENT DOCUMENTS

| | | | |
|---|---|---|---|
| 2016/0163035 A1* | 6/2016 | Chang | G06N 3/084 382/149 |
| 2018/0225550 A1* | 8/2018 | Jacobsen | G06N 3/04 |

(Continued)

OTHER PUBLICATIONS

Meng, Fanjie, et al. "Energy-efficient Gabor kernels in neural networks with genetic algorithm training method." Electronics 8.1 (2019): 105 (Year: 2019).*

(Continued)

*Primary Examiner* — Andrew T McIntosh
(74) *Attorney, Agent, or Firm* — Bayramoglu Law Offices LLC

(57) ABSTRACT

A method for constructing an efficient product surface defect detection model based on network collaborative pruning is provided. According to an initial product surface defect detection model, the method provides a network-based collaborative pruning method and constructs the efficient product surface defect detection model. On a premise of ensuring an accuracy of a product defect detection method, a product surface defect detection time is reduced to satisfy manufacturer's requirements on the product surface defect detection time and accuracy of product surface defects.

4 Claims, 2 Drawing Sheets

(58) Field of Classification Search
CPC ........... G06T 2207/30164; G06T 2207/10004; G01N 21/8851; G01N 2021/8883
See application file for complete search history.

(56) References Cited

U.S. PATENT DOCUMENTS

| | | | | |
|---|---|---|---|---|
| 2019/0056333 | A1* | 2/2019 | Wu | G06T 7/33 |
| 2019/0220972 | A1* | 7/2019 | Iwanaga | G06T 7/0004 |
| 2020/0234420 | A1* | 7/2020 | Liu | G06T 5/50 |
| 2020/0234428 | A1* | 7/2020 | George | G06F 18/2413 |
| 2020/0327654 | A1* | 10/2020 | Zhang | G06T 7/001 |
| 2020/0364573 | A1* | 11/2020 | Ramachandran | G06N 3/082 |
| 2020/0380665 | A1* | 12/2020 | Horii | G06F 17/15 |
| 2021/0125325 | A1* | 4/2021 | Huang | G06T 5/70 |
| 2021/0158223 | A1* | 5/2021 | Sezginer | G01N 21/95607 |
| 2021/0166362 | A1* | 6/2021 | Lin | G06T 7/001 |
| 2021/0334587 | A1* | 10/2021 | Wang | G06T 7/001 |

OTHER PUBLICATIONS

Tian, Haiman, et al. "Automatic convolutional neural network selection for image classification using genetic algorithms." 2018 IEEE international conference on information reuse and integration (IRI). IEEE, 2018 (Year: 2018).*

Huang, Yibin, et al. "A compact convolutional neural network for surface defect inspection." Sensors 20.7 (2020): 1974 (Year: 2020).*

Tao, Xian, et al. "Automatic metallic surface defect detection and recognition with convolutional neural networks." Applied Sciences 8.9 (2018): 1575 (Year: 2018).*

* cited by examiner

METHOD FOR CONSTRUCTING EFFICIENT PRODUCT SURFACE DEFECT DETECTION MODEL BASED ON NETWORK COLLABORATIVE PRUNING

CROSS REFERENCE TO THE RELATED APPLICATIONS

This application is based upon and claims priority to Chinese Patent Application No. 202010193038.0, filed on Mar. 18, 2020, the entire contents of which are incorporated herein by reference.

TECHNICAL FIELD

The present disclosure pertains to the field of product surface defect detection, in particular relates to a method for constructing an efficient detection model, which focuses on reducing the detection time and improving the efficiency of product defect detection.

BACKGROUND

In the process of product production, some defects on the product surface, such as scratches of mechanical components and glass surfaces, a blemish of textile fabrics, etc., that are generated due to the machinery having a breakdown, diverse production environments, or improper production processes. These surface defects significantly lower the quality of the product, greatly reduce the export price of the product, increase the cost of the product, such as the production cost, and decrease the profit of the manufacturer. Therefore, the product surface defect detection is critical in the product production process of an enterprise.

At present, many manufacturers still rely on visual inspection methods, that is, having manufacture workers visually identify and determine the surface defects of products. However, with the advance of the automation level, the production speed of the products has been greatly improved, such that the manual inspection method is gradually unable to meet the inspection requirements in the practical production process. Moreover, due to human visual fatigue and other reasons, the visual inspection method has a high probability of missed detection and false detection during the detection process of the product surface defects.

In order to avoid problems such as high missed detection rate caused by the visual fatigue, the method of using machine vision technology to replace the human visual inspection method has been proposed and gradually applied by many enterprises as automation detection technology progressing towards quick and high-quality detection of product surface defects. As shown in the major flow chart of FIG. 1, industrial cameras are used to acquire images of the product surface and detection algorithms are used to determine whether there are defects on the product surface. With the continuous development of the deep learning technology, the machine vision technology combined with the convolutional neural network (CNN) for the detection of product surface defects has become the mainstream technology in the automatic detection field. Since the convolutional neural network performs well in the detection process, it is widely used in various image tasks to achieve high-precision detection of product surface defects. However, CNNs have the following disadvantages: because the traditional convolutional neural network has many network parameters and calculations, it takes a relatively long time to detect product surface defects. With the continuous development of automation, the production speed of products has also rapidly increased. In order to keep up with the continuous increasing product production speed, there is also a need to further increase the product defect detection speed.

SUMMARY

The objective of the present invention is to reduce the time of product surface defect detection, while ensuring the detection accuracy and reducing the detection cost.

Based on an initial detection model, the present invention develops a network-based collaborative pruning method to construct an efficient product surface defect detection model. On the premise of ensuring product defect detection accuracy, the detection time for the product surface defects is greatly reduced to satisfy the manufacturer's requirements on both the detection speed and accuracy of the product surface defects, thereby implementing a quick, efficient and high-precision construction network model.

Specifically, in order to achieve the above objective, the technical solution of the present invention is to provide a method to construct an efficient detection model of product surface defects based on network collaborative pruning, including the following steps:

Step 1: using product surface defect data to build up an initial product surface defect detection model based on a convolutional neural network.

Step 2: evaluating the importance of a convolution kernel in the product surface defect detection model obtained in step 1, determining the importance of each convolution kernel in the product surface defect detection model with regard to a final detection result, finding a least important convolution kernel, and forming a candidate convolution kernel subset for pruning operations.

Step 3: transforming the evaluation of the importance of a single convolution kernel with regard to the final detection result into the evaluation of the importance of the convolution circuit with regard to the final detection result; considering approximately a selection of a convolution circuit as a search problem for the optimal architecture; encoding the convolution kernels in the candidate convolution kernel subset obtained in step 2 by using genetic algorithms; continuously performing an optimization process on the network architecture to find the redundant circuits of the network by using genetic algorithms; determining the impact on the final detection result by the synergies between a plurality of convolution kernels, and deleting the redundant circuit of the network in the product surface defect detection model obtained in step 1 to achieve the light-weighting of the product surface defect detection model.

Step 4: performing micro-training on the product surface defect detection model after pruning in step 3 by using a small amount of product sample data to improve accuracy and generalization of the model, and to enable the new product surface defect detection model to perform high-precision detection on the product surface defect.

Preferably, in step 3, when deleting network redundant circuits, an iterative pruning method is adopted to avoid great influence on the overall accuracy of the product surface defect detection model due to deleting a plurality of network redundant circuits at a time. The convolution rings in the product surface defect detection model are deleted one by one, which ensures the detection accuracy of the product surface defect detection model.

Preferably, in step 2, an evaluation method based on Taylor expansion is used to evaluate the importance of the convolution kernel in the product surface defect detection model obtained in step 1.

Preferably, the step 2 includes the following steps:

Step 201: assuming the evaluation criterion of the convolution kernel as shown in expression (1):

$$\min_{W'} |C(D|W') - C(D|W)| \qquad (1)$$

In expression (1), D represents the input image data sample, W represents the weight of the convolution kernel of the original product surface defect detection model, W' represents the weight of the convolution kernel of the product surface defect detection model after the convolution kernel is deleted, C(D|W) represents the output result of the original product surface defect detection model and C(D|W') represents the output result of the product surface defect detection model after the convolution kernel is deleted.

Step 202: assuming $h_i$ represents whether the i-th convolution kernel is deleted, and $C(D, h_i)$ represents the output result of the unpruned product surface defect detection model, then expressing the difference $\Delta C(h_i)$ between the output results before and after the convolution kernel evaluation as the following equation (2):

$$|\Delta C(h_i)| = |C(D, h_i=0) - h_i)| \qquad (2)$$

In equation (2), $C(D, h_i=0)$ represents the output result of the product surface defect detection model after removing the i-th convolution kernel $h_i$.

Step 203: approximately expressing the operation process of the product surface defect detection model as a function, using the convolution kernel in the product surface defect detection model as the input of the function, and approximately expressing the function of the product surface defect detection model by Taylor expansion.

calculating $\Delta C(h_i)$ by using a method based on the first-order Taylor expansion, and expressing the function f(x) of the convolutional neural network as the Taylor expansion at the convolution kernel x=a shown in equation (3):

$$f(x) = \sum_{p=0}^{P} \frac{f^{(p)}(a)}{p!}(x-a)^p + R_p(x) \qquad (3)$$

In equation (3), p represents the expansion order of the function, P represents the total order of the expansion, $f^{(p)}(a)$ represents the p-order derivative of function f(x) at the convolution kernel x=a, and $R_p(x)$ represents the p-order remainder term of the Taylor expansion.

Step 204: evaluating the convolution kernel in the product surface defect detection model, wherein the corresponding output result of the convolution kernel is calculated by using the first-order Taylor expansion $C(D, h_i=0)$ as shown in the following equation (4):

$$C(D, h_i = 0) = C(D, h_i) - \frac{\delta C}{\delta h_i} h_i + R_1(h_i = 0) \qquad (4)$$

In equation (4), C represents the output result of the product surface defect detection model, and $R_1(h_i=0)$ represents the remainder term, which is expressed as the following equation (5) using Lagrange interpolation formula:

$$R_1(h_i = 0) = \frac{\delta^2 C}{\delta(h_i^2 = \xi)} \frac{h_i^2}{2} \qquad (5)$$

In equation (5), $\xi$ is a number between 0 and $h_i$.

Step 205: ignoring the impact of the remainder term on the result and obtaining the evaluation criterion $\Theta_{TE}(h_i)$ of the i-th convolution kernel $h_i$ as shown in equation (6):

$$\Theta_{TE}(h_i) = |\Delta C(h_i)| = \left| C(D, h_i) - \frac{\delta C}{\delta h_i} h_i - C(D, h_i) \right| = \left| \frac{\delta C}{\delta h_i} h_i \right| \qquad (6)$$

obtaining the evaluation criterion of the impact degree of the i-th convolution kernel $h_i$ in the product surface defect detection model through equation (6).

Step 206: calculating a product of the feature map parameter $h_i$ corresponding to each convolution kernel and the gradient of the loss function for this parameter by using equation (6) to determine the impact of the feature map parameter $h_i$ on the result so as to evaluate each convolution kernel; ranking the importance of each convolution in the product surface defect detection model; finding the less important convolution kernel to form a candidate convolution kernel subset for the pruning operation.

Preferably, step 3 includes the following steps:

Step 301: performing genetic encoding on the candidate convolution kernel subset obtained in step 2; and screening the candidate convolution kernel subset by using a 0-1 encoding method according to the combination characteristics of the candidate convolution kernel subset, wherein the gene length is the length of the candidate convolution kernel subset. When the gene is 1, the candidate convolution kernel is deleted; and when the gene is 0, the candidate convolution kernel is retained.

Step 302: calculating the classification accuracy of the product surface defect detection model after deleting these convolution kernels through the encoded candidate convolution kernel subsets, and simultaneously using the classification accuracy as a value of the fitness function of the gene in genetic algorithms to perform the gene selection operation;

Step 303: performing the gene selection operation by using two-point crossover and gene mutation; finding the redundant and low-impact convolution circuits in the product surface defect detection model by continuously optimizing genetic algorithms; performing the pruning operation on the convolution circuits to reduce the calculation complexity of the product surface defect detection model.

Preferably, in step 302, the tournament selection operator is adopted to calculate the classification accuracy of the product surface defect detection model after deleting these convolution kernels.

Based on the original product surface defect detection model, the proposed method is used to implement the pruning operation on the original model, which compresses the model architecture and obtains a more efficient detection model. Compared with the original detection model, the new detection model not only has a more streamlined model architecture, but also greatly reduces the number of model parameters and calculations. The new detection model greatly reduces the calculation time of the model and improves the detection accuracy of product surface defects.

DETAILED DESCRIPTION OF THE EMBODIMENTS

Figure 1:
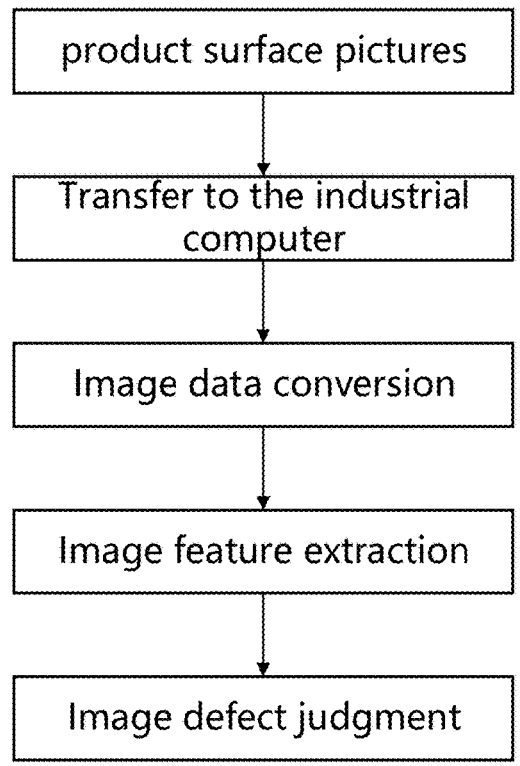
FIG. 1 is a flowchart showing the product surface defect recognition based on machine vision technology.

The present invention will be further described hereinafter in conjunction with specific embodiments. These embodiments are only used to illustrate the present invention rather than limiting the scope of the present invention. In addition, it should be understood that based on the disclosure of the present invention, those skilled in the art can make various changes or modifications to the present invention, and these equivalent forms also fall within the scope defined by the appended claims of the present application.

The present invention provides a method for constructing a high-efficiency detection neural network model. Compared with the general detection models, the high-efficiency detection neural network model can perform high-efficiency and high-precision detection on the product surface defects, and has a wide application prospect and high economic value. The specific implementation method of the key technology of the present invention is described hereinafter.

Step 1: Training a Product Surface Defect Detection Model Based on a Convolutional Neural Network by Using a Product Surface Defect Image Data Sets.

In order to construct an efficient product surface defect recognition network model, a general convolutional neural network based on the product surface defect image data is trained, and the product surface defect features is extracted by using a good feature extraction ability of the convolutional neural network to identify and determine whether there are defects on the product surface according to the product surface features extracted by the network. The product surface defect detection model based on the convolutional neural network (hereinafter referred to as a convolutional neural network) is constructed.

Step 2: Evaluating the Importance of the Convolution Kernel in the Convolutional Neural Network.

In order to reduce the parameters and calculations in the convolutional neural network, redundant convolution circuits in the original convolutional neural network are deleted. Since the general convolutional neural network has many convolution kernels, the calculation time is reduced by evaluating the importance of the convolution kernel in the convolutional neural network based on the Taylor expansion method to obtain a candidate subset of convolution kernels. The implementation steps are presented as follows:

The method based on Taylor expansion includes: analyzing the final result by using changes of each convolution kernel in the convolutional neural network. The unimportant convolution kernel that has less influence on the result in the network that is found by analyzing the single convolution kernel in the convolutional neural network. Therefore, a convolution kernel of low importance is found by comparing the results of the network obtained with or without this convolution kernel. If the two results of the network are small, the importance of the convolution kernel is low. The criterion expression is shown in expression (1):

$$\min_W |C(D|W') - C(D|W)| \tag{1}$$

In expression (1), D represents the input image data sample, W represents the weight of the convolution kernel of the original product surface defect detection model, and W' represents the weight of the convolution kernel of the product surface defect detection model after the convolution kernel is deleted, C(D|W) represents the output result of the original product surface defect detection model, and C(D|W') represents the output result of the product surface defect detection model after the convolution kernel is deleted.

In order to approximate the effect of the convolution kernel on the results, $h_i$ represents whether the i-th convolution kernel is deleted, and the output result of the unpruned product surface defect detection model is expressed as C(D, $h_i$). The difference $\Delta C(h_i)$ of the output results before and after the evaluation is expressed as the following equation (2):

$$|\Delta C(h_i)| = |C(D, h_i=0) - h_i)| \tag{2}$$

In equation (2), C(D, $h_i$=0) represents the output result of the product surface defect detection model after removing the i-th convolution kernel $h_i$.

In order to find the less important convolution kernels, the commonly used method is to delete each convolution kernel in the network one by one, compare the impact degree on the results and obtain the less important convolution kernel through the final result. However, due to the large number of convolution kernels in the convolutional neural network, this method will cause a large amount of calculations and poor practicability. In order to solve this problem, the operation process of the convolutional neural network is approximately expressed as a function expression, and the convolution kernel in the convolutional neural network is treated as the input of the function. Since the function of the convolutional neural network is relatively complicated, Taylor expansion is used to approximate the convolutional neural network.

In order to calculate $\Delta C(h_i)$, a method based on the first-order Taylor expansion is used to express the function f(x) of the convolutional neural network by using Taylor expansion at the convolution kernel x=a shown as equation (3):

$$f(x) = \sum_{p=0}^{P} \frac{f^{(p)}(a)}{p!}(x-a)^p + R_p(x) \tag{3}$$

In equation (3), p represents the expansion order of the function, P represents the total order of the expansion, $f^{(p)}(a)$ represents the p-order derivative of function f(x) at the convolution kernel x=a, and $R_p(x)$ represents the p-order remainder term of Taylor expansion.

In order to evaluate the convolution kernel in the convolutional neural network, the corresponding output result of the convolution kernel can be calculated by using the first-order Taylor expansion. C(D, $h_i$=0) can be expressed as equation (4):

$$C(D, h_i = 0) = C(D, h_i) - \frac{\delta C}{\delta h_i} h_i + R_1(h_i = 0) \tag{4}$$

In equation (4), C represents the output result of the product surface defect detection model, and $R_1(h_i=0)$ represents the remainder term, which is expressed as the following equation (5) by using Lagrange interpolation formula:

$$R_1(h_i = 0) = \frac{\delta^2 C}{\delta(h_i^2 = \xi)} \frac{h_i^2}{2} \quad (5)$$

In equation (5), $\xi$ is a number between 0 and $h_i$. The RELU function is used extensively as the activation function in the convolutional neural network so that the expression of the second-order term is also continuously getting smaller. At the same time, in order to reduce the calculations, when the importance is evaluated based on the first-order Taylor expansion method, the impact of the remainder terms in the results is ignored. Finally, the evaluation criterion $\Theta_{TE}(h_i)$ of the i-th convolution kernel $h_i$ is obtained as follows:

$$\Theta_{TE}(h_i) = |\Delta C(h_i)| = \left| C(D, h_i) - \frac{\delta C}{\delta h_i} h_i - C(D, h_i) \right| = \left| \frac{\delta C}{\delta h_i} h_i \right| \quad (6)$$

Through equation (6), the evaluation method of the impact degree of a single convolution kernel in the convolutional neural network on the result is obtained. By utilizing this method, the impact on the result is determined by calculating the product of the feature map parameter corresponding to a single convolution kernel and the gradient of the loss function for this parameter, so that the impact can be calculated relatively easily in the backpropagation, which greatly reduces the amount of calculation caused by evaluating the impact of the convolution kernel on the output results one by one.

By using the above method, each convolution kernel in the original detection model is evaluated and the importance of each convolution in the network in order is ranked to find a convolution kernel with lower importance to form a candidate set of pruning operations.

Step 3: Finding Redundant Convolution Circuits and Eliminating Redundant Convolution Circuits in the Network In order to find the redundant convolution circuit in the convolutional neural network, the synergy of the convolution kernel is regarded as a network architecture optimization problem after the candidate convolution kernel is obtained based on the first-order Taylor expansion. The obtained candidate convolution kernel is optimized the network architecture by using optimization algorithms. The evaluation of a single convolution kernel is transformed into an evaluation of the convolution circuit. The redundant convolution circuit in the network is deleted to realize the lightweighting of the detection network by determining the impact of the synergy between a plurality of convolution kernels on the result.

Figure 2:
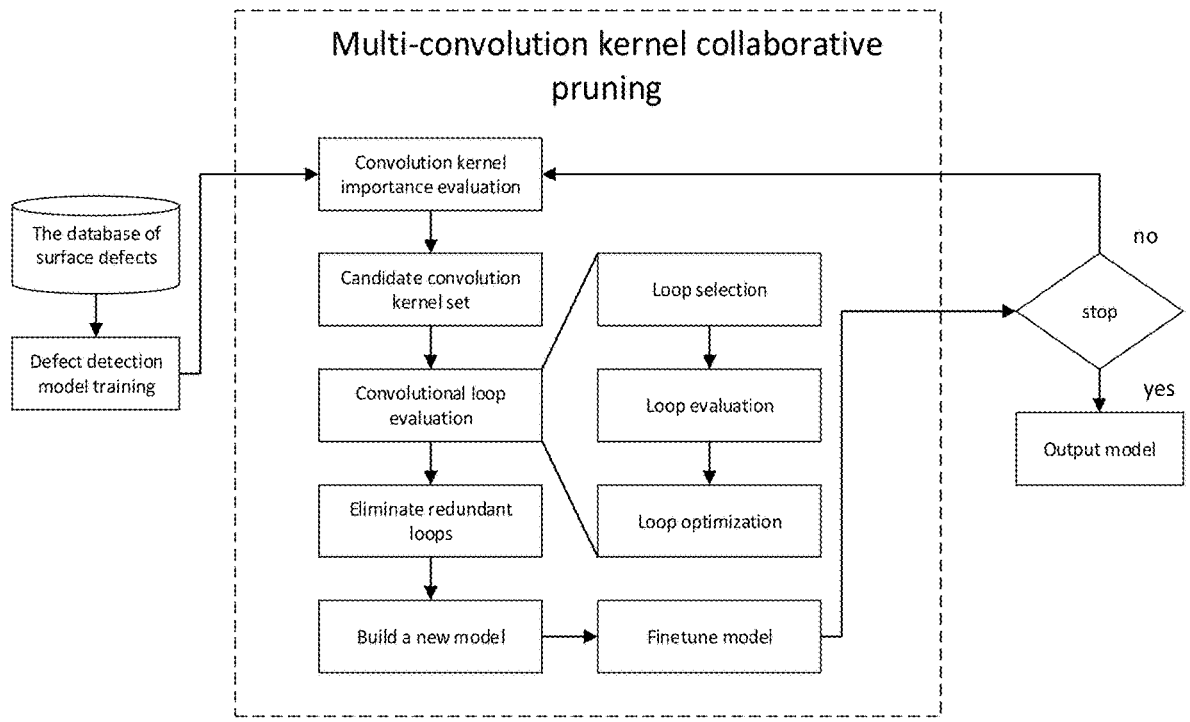
FIG. 2 is a flowchart showing the network-based collaborative pruning.

Among various optimization algorithms, the genetic algorithms have greater adaptability and powerful search capacity. In the present invention, the genetic algorithms are used to optimize the architecture of convolution kernels. The convolution kernel in the candidate convolution kernel set obtained by the first-order Taylor expansion is operated, and the circuits are evaluated in the detection network. The operation process is illustrated in FIG. 2.

(1) Convolution Kernel Encoding

Figure 3:
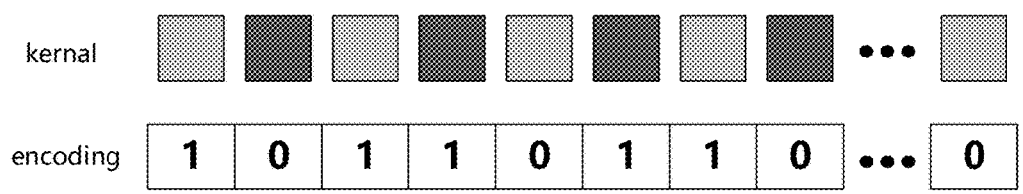
FIG. 3 is a schematic diagram showing the gene encoding method.

The candidate convolution kernel subset based on Taylor expansion in order is genetically encoded to find a relatively redundant convolution circuit. The 0-1 encoding method is used to screen the candidate convolution kernel set according to the combined characteristics of the candidate convolution kernel subset. The gene length is the length of the candidate set. When the gene is 1, the candidate convolution kernel is deleted, and when the gene is 0, the candidate convolution kernel is retained. The convolution kernel is controlled by the 0-1 encoding method, and the optimization algorithm is used to find the convolution circuit with the least impact on the network output and then delete the convolution kernel in the circuit. The gene encoding diagram is shown in FIG. 3.

(2) Circuit Selection

In order to consider the synergies between the convolution kernels, the classification accuracy of the convolutional neural network is calculated by using the genetically encoded convolution kernels after deleting these convolution kernels. At the same time, the classification accuracy is used as the value of the fitness function so as to perform the gene selection operation. The present invention adopts a tournament selection operator, wherein each time a certain number of genetic individuals are taken from the population and then the best one is selected and enters the progeny population. This operation is repeated until the new population size reaches the original population size. The specific operation steps are presented as follows:

Step 1: determining the number N of selected individuals each time.

Step 2: randomly selecting N individuals from the population (each individual has the same probability of selection) and selecting the best individual to enter the next generation according to the fitness value of each individual.

Step 3: repeating Step 2 (the number of repetitions is the size of the population) until the new population size reaches the original population size.

(3) Genetic Operations

Figure 4:
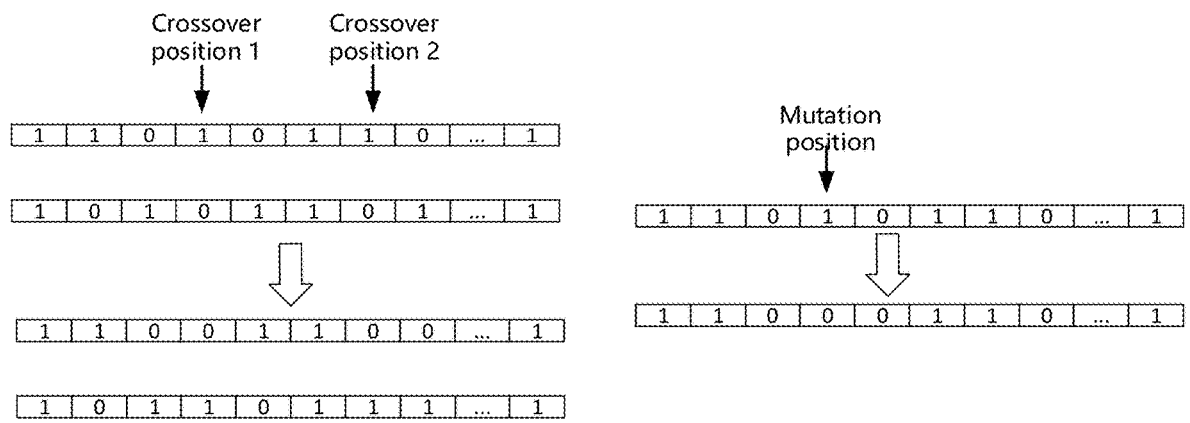
FIG. 4 is a schematic diagram showing the gene operations.

In order to avoid local optimization, the two-point crossover operation and the gene mutation operation are adopted. The schematic diagram of the crossover operation and the mutation operation is shown in FIG. 4. Through the continuous optimization of genetic algorithms, the redundant and low-impact convolution circuits are found in convolutional neural networks, these convolution circuits are pruned to reduce the calculation complexity of convolutional neural networks.

Step 4: Micro-Training the New Model to Ensure Model Generalization Performance and Detection Accuracy.

In order to ensure the accuracy and generalization performance of the new product surface defect detection model, the product surface defect detection model is micro-trained by a small amount of product surface defect sample data after the pruning operation. With fewer sample data and fewer training times, the detection accuracy of the product surface defect detection model can be restored to ensure high-precision detection of product surface defects.

Step 5: Using an Iterative Pruning Method to Avoid the Impact of Multi-Circuit Removal on the Detection Model.

In order to avoid the great impact caused by deleting a plurality of network circuits at once, an iterative pruning method is used to delete redundant circuits one by one in the network model in order to ensure the high performance of the detection model.

The method for constructing an efficient detection model provided by the present invention not only ensures the rapid detection of product surface defects, but also ensures the accuracy of defect identification. Relevant research shows that the accuracy of the new detection model obtained by gradually constructing the small model according to the large model is much higher than the network obtained by directly training the small model. Therefore, the proposed method can meet the actual detection requirements in terms of detection time and detection accuracy, which helpfully guides the establishment of the product surface defect detection model.

What is claimed is:

1. A method for constructing an efficient product surface defect detection model based on a network collaborative pruning, comprising the following steps:
  step 1) building an initial product surface defect detection model based on a convolutional neural network by using product surface defect data;
  step 2) evaluating an importance of each convolution kernel of convolution kernels in the initial product surface defect detection model obtained in step 1, determining the importance of the each convolution kernel of the convolution kernels in the initial product surface defect detection model for a final detection result, and finding less important convolution kernels to form a candidate convolution kernel subset for pruning operations;
  step 3) transforming an evaluation of the importance of one convolution kernel for the final detection result into an evaluation of an importance of a convolution circuit of convolution circuits for the final detection result; approximately considering a selection of the convolution circuit as a search problem for an optimal architecture; encoding the convolution kernels in the candidate convolution kernel subset obtained in step 2 by using a genetic algorithm; continuously optimizing a network architecture to search for network redundant circuits by using the genetic algorithm; determining an impact of a synergy between the convolution kernels on the final detection result; deleting the network redundant circuits in the initial product surface defect detection model obtained in step 1 to achieve a lightweighting of the initial product surface defect detection model to obtain a new product surface defect detection model; and
  step 4: performing a micro-training on the new product surface defect detection model after the network collaborative pruning in step 3 by using a small amount of product sample data to improve an accuracy of the initial product defect detection model and to ensure a high-precision detection of product surface defects by the new product surface defect detection model;
  wherein in step 2, an evaluation method based on a Taylor expansion is used to evaluate the importance of the each convolution kernel of the convolution kernels in the initial product surface defect detection model obtained in step 1;
  wherein step 2 comprises the following sub-steps:
    step 201) setting an evaluation criterion of the convolution kernel as expression (1):

$$\min_{W-}|C(D|W'\text{-}) - C(D|W)|; \quad (1)$$

wherein, D represents an input image data sample, W represents a weight of the convolution kernel of the initial product surface defect detection model, and W'— represents a weight of the convolution kernel of the new product surface defect detection model after the network redundant circuits are deleted, C(D|W) represents an output result of the initial product surface defect detection model, and C(D|W'—) represents an output result of the new product surface defect detection model after the network redundant circuits deleted;
    step 202) assuming $h_i$ represents whether an i-th convolution kernel is deleted, and $C(D, h_i)$ represents an output result of an unpruned product surface defect detection model, wherein a difference $\Delta C(h_i)$ between output results before and after an evaluation of the convolution kernel is expressed as the following equation (2):

$$|\Delta C(h_i)|=|C(D,h_i=0)-C(D,h_i)| \quad (2);$$

wherein, $C(D, h_i=0)$ represents an output result of the initial product surface defect detection model after removing the i-th convolution kernel $h_i$;
    step 203) approximately expressing an operation process of the initial product surface defect detection model as a function, using the convolution kernel in the initial product surface defect detection model as a function input, and approximately expressing a function of the initial product surface defect detection model by the Taylor expansion;
  calculating $\Delta C(h_i)$ by using a method based on a first-order Taylor expansion and expressing a function $f(x)$ of the convolutional neural network as the Taylor expansion at the convolution kernel x=a as shown in equation (3):

$$f(x) = \sum_{p=0}^{P} \frac{f^{(p)}(a)}{p!(x-a)^p} + R_p(x); \quad (3)$$

wherein, p represents an expansion order of the function, P represents a total order of the Taylor expansion, $f^{(p)}(a)$ represents a p-order derivative of the function f(x) at the convolution kernel x=a; and $R_p(x)$ represents a p-order remainder term of the Taylor expansion;
    step 204) evaluating the convolution kernel in the initial product surface defect detection model, wherein a corresponding output result of the convolution kernel is calculated by using the first-order Taylor expansion $C(D, h_i=0)$ as shown in the following equation (4):

$$C(D, h_i = 0) = C(D, h_i) - \frac{\delta C}{\delta h_i}h_i + R_1(h_i = 0); \quad (4)$$

wherein, C represents the output result of the initial product surface defect detection model, and $R_1(h_i=0)$ represents a remainder term, and the remainder term is expressed as the following equation (5) by using a Lagrange interpolation formula:

$$R_1(h_i = 0) = \frac{\delta^2 C}{\delta(h_i^2 = \xi)} \frac{h_i^2}{2}; \quad (5)$$

wherein, $\xi$ is a number between 0 and $h_i$;
    step 205) ignoring an impact of the remainder term on output result, and obtaining the evaluation criterion $\Theta_{TE}(h_i)$ of the i-th convolution kernel $h_i$ as shown in equation (6):

$$\Theta_{TE}(h_i) = |\Delta C(h_i)| = \left|C(D, h_i) - \frac{\delta C}{\delta h_i}h_i - C(D, h_i)\right| = \left|\frac{\delta C}{\delta h_i}h_i\right|; \quad (6)$$

obtaining an evaluation criterion of an impact degree of the i-th convolution kernel $h_i$ in the initial product surface defect detection model on a result according to equation (6); and step 206) calculating a product of a feature map parameter $h_i$ corresponding to the each convolution kernel of the convolution kernels and a gradient of the feature map parameter of a loss function by using the evaluation criterion of formula (6); and determining an impact on the result to evaluate the importance of the each convolution kernel of the convolution kernels in the initial product surface defect detection model, finding the less important convolution kernels, and forming the candidate convolution kernel subset for the pruning operations.

2. The method of claim 1, wherein in step 3, when a network redundant circuit of the network redundant circuits is deleted, an iterative pruning method is used to overcome an impact on an overall accuracy of the initial product surface defect detection model caused by removing the network redundant circuits at a time; and in the iterative pruning method, the network redundant circuits in the initial product surface defect detection model are deleted one by one to ensure a detection accuracy of the initial product surface defect detection model.

3. The method of claim 1, wherein step 3 comprises the following sub-steps:

step 301) performing a genetic encoding on the candidate convolution kernel subset obtained in step 2; according to combination characteristics of the candidate convolution kernel subset, and screening the candidate convolution kernel subset by using a 0-1 encoding method, wherein a gene length is a length of the candidate convolution kernel subset; when a gene is 1, a candidate convolution kernel is deleted, and when the gene is 0, the candidate convolution kernel is retained;

step 302) calculating a classification accuracy of the initial product surface defect detection model after deleting the convolution kernels according to the candidate convolution kernel subset after the genetic encoding, and at a same time, using the classification accuracy as a value of a fitness function in the genetic algorithm to perform a selection operation; and step 303) performing the selection operation by using a two-point crossover and a mutation operation; continuously optimizing by using the genetic algorithm to find redundant and low-impact convolution circuits in the initial product surface defect detection model; and pruning the redundant and low-impact convolution circuits to reduce a calculation complexity of the initial product surface defect detection model.

4. The method of claim 3, wherein in step 302, a tournament selection operator is used to calculate the classification accuracy of the initial product surface defect detection model after removing the redundant and low-impact convolution kernels.

\* \* \* \* \*